United States Patent
Ichishi et al.

(10) Patent No.: US 7,222,665 B2
(45) Date of Patent: May 29, 2007

(54) VEHICLE AIR CONDITIONING SYSTEM WITH AIR TEMPERATURE SENSOR

(75) Inventors: Yoshinori Ichishi, Kariya (JP); Tatsumi Kumada, Kariya (JP)

(73) Assignee: DENSO Corporation, Kariya (JP)

( * ) Notice: Subject to any disclaimer, the term of this patent is extended or adjusted under 35 U.S.C. 154(b) by 257 days.

(21) Appl. No.: 10/680,743

(22) Filed: Oct. 7, 2003

(65) Prior Publication Data

US 2004/0103679 A1    Jun. 3, 2004

(30) Foreign Application Priority Data

Oct. 11, 2002   (JP)   ............................ 2002-299207

(51) Int. Cl.
  *F25B 29/00*   (2006.01)
  *B60H 1/00*   (2006.01)
  *B60H 3/00*   (2006.01)

(52) U.S. Cl. .................. 165/202; 165/203; 165/42; 165/43; 165/204; 165/291; 236/49.3; 236/51; 236/91 C; 236/91 E; 374/141; 374/147; 454/75

(58) Field of Classification Search ................ 165/202, 165/201, 203, 42, 43, 204, 291; 236/91 C, 236/49.3, 91 E, 51; 374/147, 141; 454/75
See application file for complete search history.

(56) References Cited

U.S. PATENT DOCUMENTS

| | | | | |
|---|---|---|---|---|
| 4,375,754 A | * | 3/1983 | Okura | .................. 62/180 |
| 4,941,525 A | * | 7/1990 | Ito et al. | .................. 165/202 |
| 5,392,845 A | * | 2/1995 | Honda et al. | .................. 165/203 |
| 6,202,934 B1 | * | 3/2001 | Kamiya et al. | .................. 236/91 C |
| 6,397,615 B1 | * | 6/2002 | Kawai et al. | .................. 62/244 |
| 6,550,686 B2 | * | 4/2003 | Kawai et al. | .................. 236/49.3 |
| 6,625,997 B1 | * | 9/2003 | Schultz | .................. 62/186 |
| 6,659,358 B2 | * | 12/2003 | Kamiya et al. | .................. 236/91 C |
| 6,732,538 B2 | * | 5/2004 | Trigiani et al. | .................. 62/129 |
| 2001/0039806 A1 | * | 11/2001 | Kawai et al. | .................. 62/229 |
| 2001/0045099 A1 | * | 11/2001 | Ohga et al. | .................. 62/186 |
| 2002/0053601 A1 | * | 5/2002 | Kamiya et al. | .................. 236/49.3 |

* cited by examiner

*Primary Examiner*—John K. Ford
(74) *Attorney, Agent, or Firm*—Harness, Dickey & Pierce, PLC

(57) ABSTRACT

A vehicle air conditioning system uses a non-contact temperature sensor for feedback control of the temperature of the air blown out from a blowing opening. The degrees of opening of an air mix damper and a bypass open/close damper are controlled by actuators that respond in accordance with a temperature detected by the non-contact sensor so the blowing temperature will ultimately approach a target value. Air conditioning control is achieved as desired by this feedback control of the blowing temperature without providing wiring for a temperature sensor near the blowing opening.

11 Claims, 6 Drawing Sheets

FIG. 2
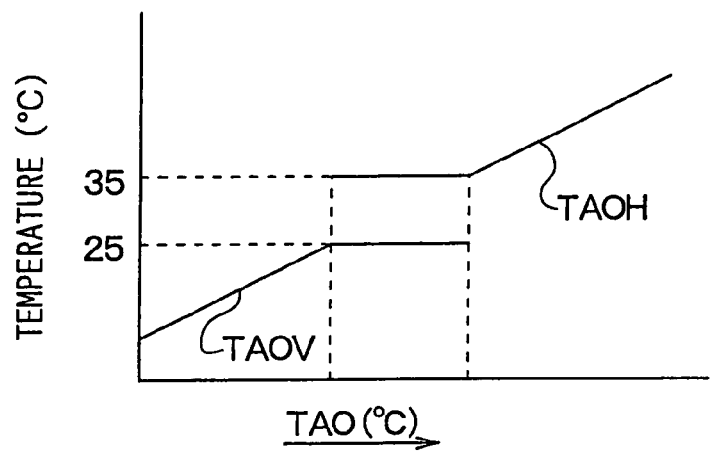
FIG. 3
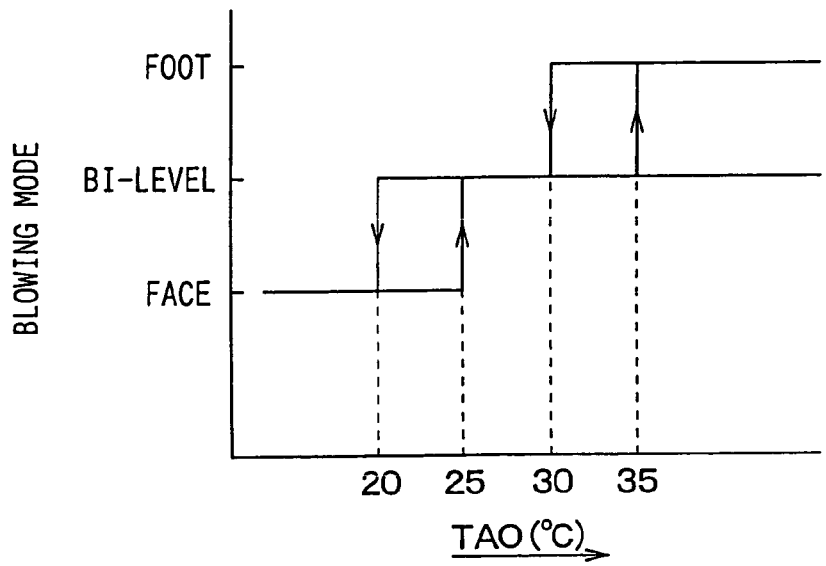
FIG. 4
| BLOWING MODE | TARGET BLOWING TEMPERATURE | DEGREE OF OPENING OF A/M DAMPER | BYPASS OPEN/CLOSE |
|---|---|---|---|
| FACE BI-LEVEL | TAOV | — | SWBn |
|  | TAOH | SWn | — |
| FOOT | TAOH | SWn | CLOSE |

VEHICLE AIR CONDITIONING SYSTEM WITH AIR TEMPERATURE SENSOR

CROSS REFERENCE TO RELATED APPLICATIONS

This application is based upon, claims the benefit of priority of, and incorporates by reference, the contents of Japanese Patent Application No. 2002-299207 filed Oct. 11, 2002.

BACKGROUND OF THE INVENTION

1. Field of the Invention

The present invention relates to a vehicle air conditioning system that achieves control of the blowing air temperature using a non-contact temperature sensor.

2. Description of the Related Art

A known vehicle air conditioning system includes an air conditioning (A/C) unit for supplying conditioned air, a duct system for guiding the air from the A/C unit to a blowing opening, and a contact temperature sensor for detecting the temperature of the conditioned air inside the duct. The contact temperature sensor detects the temperature of an object (blown air) with which it has physical contact. The sensor is typically a thermistor.

The air conditioner also includes an A/C computer for feedback control of the A/C unit based on the temperature detected by the sensor to cause the temperature of air blown from a blowing opening to approach its target value (see, for example, Japanese Patent Laid-Open Publication No. Hei. 6-262933).

In order to precisely achieve the target temperature, the contact temperature sensor needs to be located in the duct system as near as possible to the blowing opening, allowing for the heat loss of the air inside the duct system. Thus, for a long duct system, long electric cables are required for the connection of the contact temperature sensor near the blowing opening with the A/C computer. This leads to a high cost because of the material cost of the electric cables, and lowers assembling operation efficiency.

SUMMARY OF THE INVENTION

In view of the foregoing, an object of the present invention is to provide a vehicle air conditioning system that controls the temperature of air in a passenger compartment without using a temperature sensor that works on contact.

To achieve the above object, according to a first aspect of the present invention, a vehicle air conditioning system has a temperature adjusting means (10) for adjusting a temperature of blown air, including conditioned air, from a blowing opening (31) into a passenger compartment. The system further includes a non-contact temperature sensor (50) for detecting a temperature of its sensing region that includes at least one blowing opening, and a control means (4, S240) for controlling the temperature adjusting means to achieve the desired temperature adjustment of blown air using the temperature detected by the non-contact temperature sensor.

The temperature adjusting means is controlled to adjust the air temperature based on the temperature detected by the non-contact temperature sensor. Air conditioning control is thus achieved as desired by this feedback control of the temperature of air blown from a blowing opening without using a contact temperature sensor. In other words, air conditioning in the passenger compartment is achieved without using a contact temperature sensor.

A conventional contact temperature sensor arranged inside a blowing opening can only detect a local temperature. If there is an uneven temperature distribution in the blowing opening, the temperature adjustment using this local temperature may result in unsatisfactory air conditioning.

According to the first aspect of the invention, the sensing region of the non-contact temperature sensor includes at least one blowing opening entirely, so that the sensor can detect the average blowing temperature. By adjusting the temperature using this average value, the air conditioning control is performed with a high degree of precision.

In a conventional air conditioning system that includes means for adjusting the temperature of interior material in the passenger compartment and that uses a contact temperature sensor for the temperature detection, electric cables are required for the connection of the contact temperature sensor with the control means or A/C computer.

An air conditioning system according to a second aspect of the invention has a temperature adjusting means (81) for adjusting the temperature of an interior material in a passenger compartment, a non-contact temperature sensor (50) for detecting a temperature of its sensing region, which includes at least the interior material, in a non-contact manner, and a control means (40, S240) for controlling the temperature adjusting means to achieve temperature adjustment of the temperature of the interior material using the temperature detected by the non-contact temperature sensor.

Air conditioning control in the passenger compartment is thereby achieved as desired by the feedback control of the temperature of the interior material without using a contact temperature sensor. The sensing region of the non-contact temperature sensor should preferably include the interior material entirely, so that the precision of the temperature control is improved as compared to the prior art by adjusting the air temperature based on an average temperature of the interior material.

According to a third aspect of the invention, the temperature adjusting means may have both functions, that is, of adjusting the temperature of blown air and of adjusting the temperature of the interior material using this temperature-controlled air.

Further, according to a fourth aspect of the invention, the control system is designed such that, if the difference between an expected air temperature and an actual temperature detected by the non-contact temperature sensor is larger than a preset value, the temperature control by the control means relative to the detected temperature is not affected by the large difference. Thereby, even if the sensing region of the non-contact temperature sensor includes an object whose temperature is extremely higher or lower than the ambient temperature of the passenger compartment (e.g., a container of ice cream or a burning cigarette), the temperature control by the control means is not affected by the temperature indicative of this cool or hot object, so that air conditioning is always achieved as desired.

Moreover, according to a fifth aspect of the invention, the control means controls the temperature adjusting means using a temperature detected by the non-contact temperature sensor after a predetermined time has passed after the start of air blowing. The temperature detected by the non-contact temperature sensor may also be used as the basis for determining from which blowing opening to blow out air.

That is, according to a sixth aspect of the invention, a vehicle air conditioning system adjusts a temperature of blown air and blows out conditioned air from a blowing opening (31) to a passenger compartment. The system includes a non-contact temperature sensor (50) for detecting a temperature of its sensing region including at least one blowing opening in a non-contact manner, and a selecting means (S470) for selecting from which blowing opening (31) to blow out air based on the temperature detected by the non-contact temperature sensor.

According to a seventh aspect of the invention, the selecting means selects a blowing opening based on the temperature detected by the non-contact temperature sensor after a predetermined time has passed after the start of air blowing. The air temperature becomes stable after the predetermined time has passed. Thus using this temperature as the basis accurately makes the selection.

According to an eighth aspect of the invention, the non-contact temperature sensor includes a plurality of temperature sensing elements, each capable of detecting the temperature of the sensing region in the passenger compartment in a non-contact manner, the temperature of the sensing region being detected by at least one of these temperature sensing elements. For example, while one temperature-sensing element detects the temperature of the sensing region including a blowing opening, the other elements may detect a surface temperature of a passenger or other objects.

According to a ninth aspect of the present invention, a computer-readable recording medium stores a program. The program allows a computer used with a vehicle air conditioning system, having a temperature adjusting means (10) for adjusting a temperature of blowing conditioned air from a blowing opening (31) into a passenger compartment, to serve as a control means (4, S240). The control means (4, S240) serves in a manner such that the temperature adjusting means is controlled to achieve the desired temperature adjustment of blown air using a temperature of its sensing region including at least one blowing opening detected by a non-contact temperature sensor (50).

According to a tenth aspect of the present invention, a computer-readable recording medium stores a program. The program allows a computer used with a vehicle air conditioning system, which has a temperature adjusting means (81) for adjusting a temperature of an interior material in a passenger compartment and a non-contact temperature sensor (50) for detecting a temperature of its sensing region including at least the interior material in a non-contact manner, to serve as a control means (40, S240). The control means (40, S240) serves in a manner such that the temperature adjusting means is controlled to adjust the temperature of the interior material using the temperature detected by the non-contact temperature sensor.

According to an eleventh aspect of the present invention, a computer-readable recording medium stores a program for allowing a computer used with a vehicle air conditioning system for adjusting a temperature of blown air and for blowing out conditioned air from a blowing opening (31) to a passenger compartment, to serve as a selecting means (S470). The selecting means (S470) selects from which blowing opening to blow out air using the temperature of its sensing region including at least one blowing opening detected by a non-contact temperature sensor (50).

Incidentally, the parenthesized numerals accompanying the foregoing individual aspects correspond with the embodiments to be described later. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a graph showing, in part, how the control unit in FIG. 1B operates;

FIG. 3 is a graph showing, in part, how the control unit in FIG. 1B operates;

FIG. 4 is a table showing, in part, how the control unit in FIG. 1B operates;

DETAILED DESCRIPTION OF THE PREFERRED EMBODIMENTS

The following description of the preferred embodiments is merely exemplary in nature and is in no way intended to limit the invention, its application, or uses.

First Embodiment

Figure 1A:
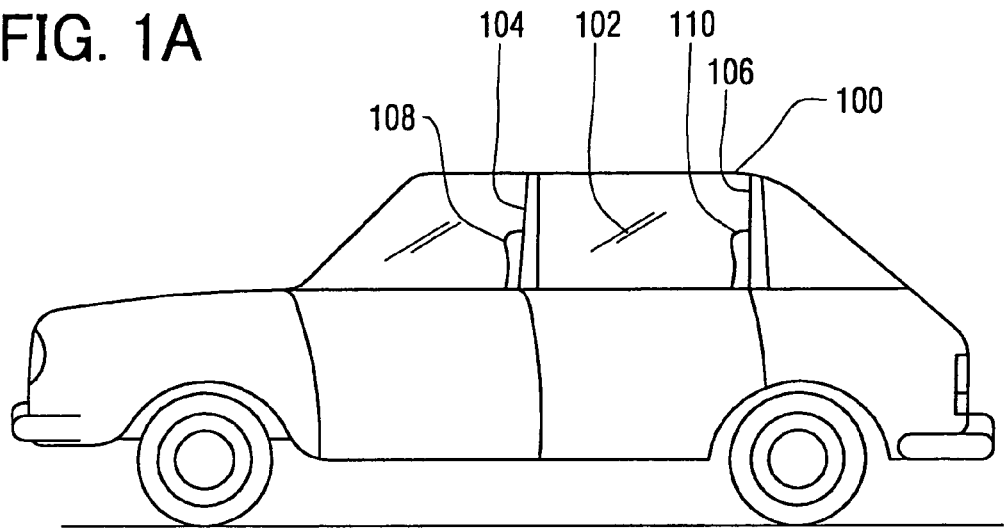
FIG. 1A is a side view of a representative automobile in which the vehicle air conditioning system is located.
Figure 1B:
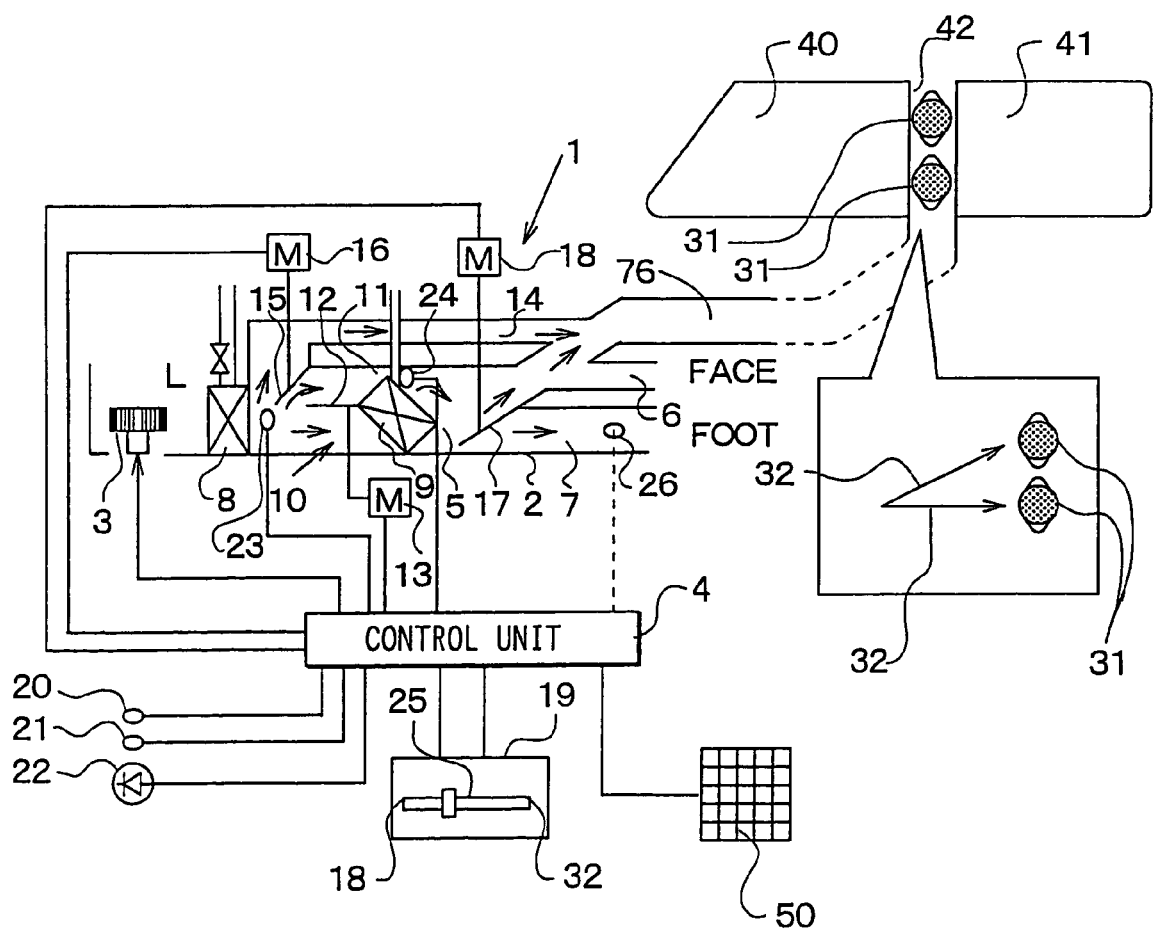
FIG. 1B is a schematic representation of the configuration of the vehicle air conditioning system according to a first embodiment of the invention.

FIG. 1B to FIG. 6 illustrate a vehicle air conditioning system according to a first embodiment of the invention. FIG. 1B is a schematic representation of the configuration of the vehicle air conditioning system. The system includes an air conditioning (A/C) unit 1 that has a duct 2 for supplying air into the passenger compartment. Upstream of the duct 2 is mounted a blower 3 including an inside/outside air switching means (not shown) located at an air inlet for selectively introducing inside air or outside air. The blower 3 produces an air flow toward the compartment inside the duct 2. The volume of blown air is adjusted by a control unit 4 to be described later.

FIG. 1A shows a representative automobile 100 in which the air conditioning system 1 is located. The automobile 100 has a passenger compartment 102 into which air conditioned air is blown, a B-pillar 42 and a C-pillar 106. Adjacent to the B-pillar 42 is a front seat 108 and adjacent to the C-pillar 106 is a rear seat 110.

The duct 2 includes an upstream side main passageway 5, and first to third passageways 6, 7, 76 branching from the main passageway 5. The first passageway 6 guides air from the main passageway 5 to a face blowing opening that opens in the instrument panel toward the rear of the vehicle for blowing out air toward the upper half of a passenger's body.

The second passageway 7 guides air from the main passageway 5 to a foot blowing opening that opens downwardly in the instrument panel to the rear for blowing out air toward the feet of the passenger. The third passageway 76 guides air from the main passageway 5 to blowing openings 31 behind the front driver and passenger seats. These blowing openings 31 are arranged in B-pillars 42 on one side of the driver's seat and front passenger seat for blowing air toward the upper half of the passengers' body in the front seats. The B-pillars 42 support the ceiling between the front and rear side windshields 40, 41.

Upstream of the main passageway 5 is provided an evaporator 8 or cooling means for cooling air passing through the passageway. The evaporator 8 is a constituent element of the refrigeration cycle, and is activated by control of the refrigeration cycle by means of the control unit 4. Within the main passageway 5 downstream of the evaporator 8 is provided a heater core 9 or heating means for heating air passing through the passageway. The heater core 9 heats the air inside the main passageway 5 with a supply of cooling water, which is hot, from the drive engine (not shown). Inside the main passageway 5 is also provided heat adjustment means 10 for adjusting the air heating by the heater core 9.

The heat adjustment means 10 includes a bypass passageway 11 arranged in the main passageway 5 such as to bypass the heater core 9, and an air mix damper 12 for adjusting the volume of air passing through the heater core 9 and that of air passing through the bypass passageway 11. An actuator 13 adjusts the degree of opening of this air mix damper 12 by the control of the control unit 4.

The heat adjustment means 10 also includes a cooling air bypass passageway 14 for guiding cooling air from the evaporator 8 directly into the third passageway 76 such as to bypass the heater core 9 and bypass passageway 11. The heat adjustment means 10 further includes a bypass open/close damper 15 located upstream of the cooling air bypass passageway 14 for opening and closing the same as well as adjusting its degree of opening. An actuator 16 such as a servo motor drives the bypass open/close damper 15 or bypass open/close means by the control of the control unit 4. The heat adjustment means 10 adjusts the temperature of air passing through the third passageway 76 and thus is termed a "temperature adjusting means" in the appended claims 1 to 3.

A passageway open/close damper 17 or passageway open/close means is provided at a location where the first passageway 6 and second passageway 7 branch from the main passageway. The damper 17 closes both the first and third passageways 6, 76 and opens the second passageway 7, or closes the second passageway 7 and opens both the first and third passageways 6, 76, or opens all of the first to third passageways 6, 7, 76. An actuator 18 drives the passageway open/close damper 17 by the control of the control unit 4.

The control unit 4 includes a computer and controls the current supply to various electrical components of the vehicle air conditioning system 1 in accordance with passenger-selected settings or signals input from various sensors. The control unit 4 includes an operation panel (not shown) for allowing the passenger to control temperature settings. The operation panel includes a switch for selecting an automatic air conditioning mode (not shown), switches for various modes (not shown), and a temperature setting device 19 for setting a desired temperature in the compartment.

The air conditioning system includes various sensors such as an inside air temperature sensor 20 for detecting the temperature inside the compartment, an outside air temperature sensor 21 for detecting the temperature outside the vehicle, a solar sensor 22 for detecting sunlight radiation entering the vehicle, an after-evaporator sensor 23 for detecting the temperature of air that has passed through the evaporator 8, a water temperature sensor 24 for detecting the temperature of cooling water for the heater core 9, and a second temperature sensor 26 for detecting the temperature of air that passes through the second passageway 7 and that of air blown toward the feet of the passenger.

The vehicle air conditioning system further includes a non-contact temperature sensor 50 such as a thermopile sensing element that is arranged near the room mirror in front of the driver's seat, its sensing region including the two blowing openings 31. The sensor 50 is arranged in a direction toward the two blowing openings 31 as indicated by the arrows 32 in FIG. 1B so as to be able to detect the blowing temperature of both blowing openings 31.

More specifically, the non-contact temperature sensor 50 consists of a plurality of infrared sensor elements (temperature sensing elements) arranged in two dimensions, and each infrared sensor element generates an electromotive force as an output signal proportional to the infrared radiation incident thereto. Accordingly, the non-contact temperature sensor 50 is capable of detecting the temperature of the region including the two blowing openings 31 in a non-contact manner with more than one infrared sensor element.

When the user selects the automatic air conditioning mode, the control unit 4 executes automatic control of the blowing temperature, flow amount, and orientation of the blowing openings so as to maintain the temperature inside the compartment at the set value selected through the temperature setting device 19. The control unit 4 calculates a required blowing temperature TAO from the following equation 1 based on input sensor signals in order to achieve automatic air conditioning, in which Kset, Kr, Kam, Ks, C are constants for correction:

$$TAO = Kset \cdot Test - Kr \cdot Tr - Kam \cdot Tam - Ks \cdot Ts - C \quad \text{[Equation 1]}$$

Tset is a temperature value set through the temperature setting device 19, Tr is an inside air temperature detected by the sensor 20, Tam is an outside air temperature detected by the sensor 21, and Ts represents sunlight radiation detected by the solar sensor 22. The control unit then determines a target blowing temperature TAOV of the first passageway 6 and a target blowing temperature TAOH of the second passageway 7 from the obtained required blowing temperature TAO, from a graph shown in FIG. 2.

Also, the control unit 4 automatically selects one of the bi-level mode, face mode, and foot mode based on the required blowing temperature TAO, from a graph shown in FIG. 3. The blowing mode can also be set manually by the passenger.

In the foot mode, the first and third passageways 6, 76 are closed while the second passageway 7 is opened, so as to blow out conditioned air toward the feet of the passenger from the foot blowing opening. The cooling air bypass passageway 14 at this time is closed by the bypass open/close damper 15, as shown in FIG. 4. Further, the temperature of the air blown into the second passageway 7 is controlled by the degree of opening SWn of the air mix damper 12 so that it approaches the target blowing temperature TAOH.

In the face mode, the first and third passageways 6, 76 are opened while the second passageway 7 is closed, so as to blow out conditioned air from the face blowing opening toward the upper half of the passenger's body, and from the blowing openings 31. The temperature of the air blown out from the first passageway 6 is controlled by the degree of opening SWn of the air mix damper 12 so that it approaches the target blowing temperature TAOH. Similarly, the temperature of the air in the third passageway 76 is controlled by the degree of opening SWBn of the bypass open/close damper 15 so that it approaches the target blowing temperature TAOV.

In the bi-level mode, all the first to third passageways 6, 76 are opened, so as to blowout conditioned air from the face blowing opening toward the upper half of the passenger's body, from the blowing openings 31, and from the foot blowing opening toward the feet of the passenger.

The temperature of the air blown out from the first and second passageways 6, 7 is controlled by the degree of opening SWn of the air mix damper 12 so that it approaches the target blowing temperature TAOH. Similarly, the temperature of the air blown out from the third passageway 76 is controlled by the degree of opening SWBn of the bypass open/close damper 15 so that it approaches the target blowing temperature TAOV.

The degree of opening SWn of the air mix damper 12 is determined by PID control algorithms using the following equations 2 to 4, from a blowing temperature TAV detected by the non-contact temperature sensor 50, the air temperature around the feet TAH detected by the second temperature sensor 26, and the deviations from their respective target blowing temperatures, as will be described later.

$$En = TAOH - TAH \quad \text{[Equation 2]}$$

$$EBn = TAV - TAOV \quad \text{[Equation 3]}$$

$$SWn = SWn-1 + kp\{En - En-1 + \theta \cdot En/Ti + Td(En - 2En-1 + En-2)/\theta\} \quad \text{[Equation 4]}$$

n−1 is the value 0 seconds before the current value n in the control cycle and n−2 is the value 0 seconds before the previous value n−1 in the control cycle. kp is the proportional gain, Ti is the integral time, and Td is the derivative time.

The target degree of opening SWBi of the bypass open/close damper 15 is obtained by the following equations:

$$SWBi = \Sigma SWBn-ti + SWBni \ (\%)$$

$$SWBni = KPB \times \{(EnBi - En-iBi) + \theta/T1 \times EnBiI \ (\%)\} \quad \text{[Equation 5]}$$

It is assumed here that θ=4 in the control cycle, kpb=1.08, EnBi is the current value of EBi, and TI=10. En−1Bi is the EBi value immediately before EnBi. En−1Bi=EnBi when the ignition switch IG is turned on.

Figure 5:
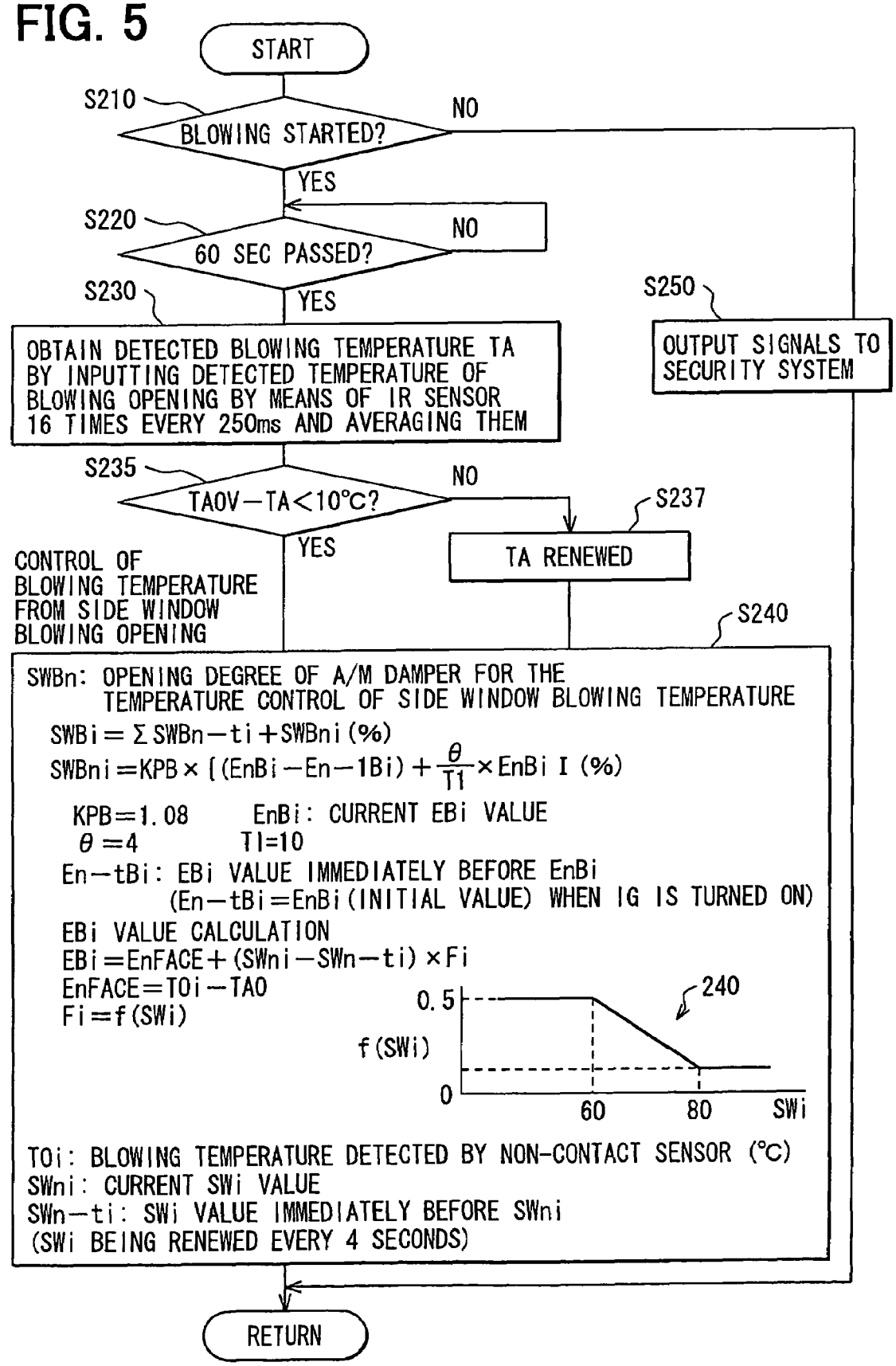
FIG. 5 is a flowchart of the operation of the control unit in FIG. 1B.

EBi is calculated from the following equation 6; f(sw) or Fi is obtained from the graph 240 in step S240 of the flowchart of FIG. 5. TOi is the temperature detected by the non-contact temperature sensor (IR sensor) 50 and equals to the aforementioned blowing temperature TAV. SWni is the current value of SWi, and SWn−1i is the immediately previous SWni.

$$Ebi = EnFACE + (SWni - SWn-ti) \times Fi$$

$$EnFACE = Toi - TAO$$

$$Fi = f(SWi) \quad \text{[Equation 6]}$$

The letter "i" in the equations collectively represents both cases "Dr" where the blowing openings 31 are provided in the B-pillar 42 on the driver's seat side and "Pa" where it is provided on the front passenger seat side.

The control operation according to one embodiment of the invention is described below with reference to the flowchart of FIG. 5.

The control unit 4 starts the control program when the power is turned on and performs the steps as shown in the flowchart of FIG. 5, which are repeated in cycles. First, at step S210, the control unit determines whether or not the blowing openings 31 have begun blowing air.

If the automatic air conditioning mode has been selected with the face mode or bi-level mode, for example, the control unit decides that blowing of air has been started. If the face mode or bi-level mode has been manually selected by the passenger, it is likewise judged that blowing of air has been started.

At step S220, the control unit determines whether or not a preset period of, for example, 60 seconds, has passed from the start of the blowing of air. If the condition is "YES," the control unit acquires the temperature of the region including the blowing openings 31 from the non-contact temperature sensor (IR sensor 50) in the next step S230. This detected temperature may be, for example, an average value of temperatures detected by the plurality of infrared sensor elements.

In step S230, an average of the temperature detected this time and the temperatures detected 15 times previously in this step is calculated. The obtained average temperature is determined as the blowing temperature TA, and is referred to also as "detected temperature TOi." The temperature detection in this step may be performed at a preset interval of, for example, 250 msec.

Next, the control unit obtains the absolute value |TAOV−TA| of the difference between the target blowing temperature TAOV and actual blowing temperature TA, and determines whether or not |TAOV−TA| is equal to, or less than, 10° C. (S235). If the condition is "YES," the control unit proceeds to step S240.

In this step, the blowing temperature of the blowing openings 31 is controlled in the following manner. The respective target degrees of opening SWn and SWBi of the air mix damper 12 and bypass open/close damper 15 are obtained from the PID control algorithms using the blowing temperature TA and above equations 2 to 6, on the basis of which the actuators 13, 16 are controlled, so as to achieve the target degrees of opening SWn and SWBi.

Here, the volume of air that needs to be supplied from the blower 3 is determined based on the required blowing temperature TAO and predetermined blower characteristics. The blower supplies a constant amount of air when TAO is in the middle region, but supplies more air when TAO is higher than that and less air when TAO is lower than that. The control unit causes the blower 3 to supply air in the amount thus determined. Further, the control unit selects one of the foot mode, face mode, and bi-level mode based on TAO and the graph of FIG. 2.

If the face mode or bi-level mode is selected, for example, some of the air supplied from the blower 3 and passed through the evaporator 8 flows into the cooling air bypass passageway 14 in a proportion determined by the target degree of opening SWBI of the bypass open/close damper 15, which has been set by the actuator 16 as noted above. The rest of the air that has passed through the evaporator 8 flows into the bypass passageway 11 of the heat adjustment means 10 and into the heater core 9. The ratio of the air flowing into the bypass passageway 11 to the air flowing into the heater core 9 is determined by the target degree of opening SWn of the air mix damper 12.

The air passing through the bypass passageway 11 and the air passing through the heater core 9 are mixed in the main passageway 5, which is then blown out into the first and third passageways 6, 76. The air that has flown into the first passageway 6 is blown out into the compartment from the face blowing opening. The air blown from the main passageway 5 into the third passageway 76 is mixed with the air that has passed through the cooling air bypass passageway 14, which is then blown out into the compartment from the two blowing openings 31.

The temperature of the air traveling through the first passageway 6 and blown from the face blowing opening thus approaches the target blowing temperature TAOV, and the temperature of the air traveling through the third passageway 76 and blown from the blowing openings 31 approaches the target blowing temperature TAOH.

In step S235, if the control unit determines that the absolute value |TAO−TA| is 10° C. or more, it proceeds to step S237, where the current blowing temperature TA obtained in step S230 is replaced by the blowing temperature TA obtained 180 seconds before in step S230, before proceeding to step S240. Instep S210, if the automatic air conditioning mode has not been selected by the user, and if the bi-level mode has not been manually set, the control unit determines that the condition is "NO" and starts to send output of the plurality of sensor elements of the IR sensor 50 to a security system device (not shown) so as to help detect an intruder such as a car thief.

According to the embodiment, as described above, the target degrees of opening SWn, SWBi of the air mix damper 12 and bypass open/close damper 15 are determined using the temperature detected by the non-contact temperature sensor 50 and not by a contact temperature sensor, based on which the actuators 13, 16 are controlled so as to achieve the target degrees of opening SWn, SWBi. The blowing temperature of the blowing openings 31 approaches the target value by the adjustment of the degrees of opening SWn, SWBi of the dampers to achieve their target values. Air conditioning control is thus achieved as desired by this feedback control of the blowing temperature, without using a contact temperature sensor. In other words, air conditioning in the passenger compartment is achieved without using a contact temperature sensor.

A conventionally used contact temperature sensor such as a thermistor arranged inside the blowing openings 31 can only detect a local temperature. If there is an uneven distribution of temperature in the blowing openings, the temperature adjustment using this local temperature may result in unsatisfactory air conditioning.

In this embodiment, however, the sensing region of the non-contact temperature sensor 50 includes the two blowing openings 31 entirely, so that the sensor 50 can detect the average temperature of air in the blowing openings 31. By adjusting the temperature using this average value in the blowing openings 31, the air conditioning control is performed with high degree of precision.

In this embodiment, moreover, in step S235, if the control unit determines that the absolute value |TAO−TA| of the difference between the required blowing temperature TAO and actual blowing temperature TA detected by the non-contact temperature sensor 50 is equal to, or more than, a preset value, e.g., 10° C., the current blowing temperature TA obtained in step S230 is replaced by the blowing temperature TA obtained 180 seconds before in step S230, before proceeding to step S240. That is, the target degrees of opening SWn, SWBi are determined and temperature control performed using the blowing temperature TA that is obtained 180 seconds before in step S230.

Thereby, even if the sensing region of the non-contact temperature sensor 50 includes an object whose temperature is extremely higher or lower than the ambient temperature of the passenger compartment (e.g., a container of ice cream or a burning cigarette), the control of the air mix damper 12 and bypass open/close damper 15 relative to TA is not affected by this extreme temperature. This prevents the temperature control from being adversely affected by the cool or hot object.

Furthermore, the blowing temperature TA is a value detected by the non-contact temperature sensor 50 sixty seconds after the blowing openings 31 have begun blowing air. The blowing temperature of the blowing openings 31 becomes substantially the same as that of the components forming the blowing openings 31 about 60 seconds after the start of the blowing. Since the non-contact temperature sensor 50 detects the temperature of these components as the blowing temperature, a more precise value is obtained by performing the temperature detection 60 seconds after the start of the blowing. The temperature adjustment by the control of the air mix damper 12 and bypass open/close damper 15 is therefore accurately achieved because it is based on this more precise temperature.

Second Embodiment

In the previous embodiment, the control unit 4 selects a suitable blowing mode based on the required blowing temperature TAO in the automatic air conditioning mode. In this embodiment, the blowing mode is selected based on the temperature detected by the non-contact temperature sensor 50.

Figure 6:
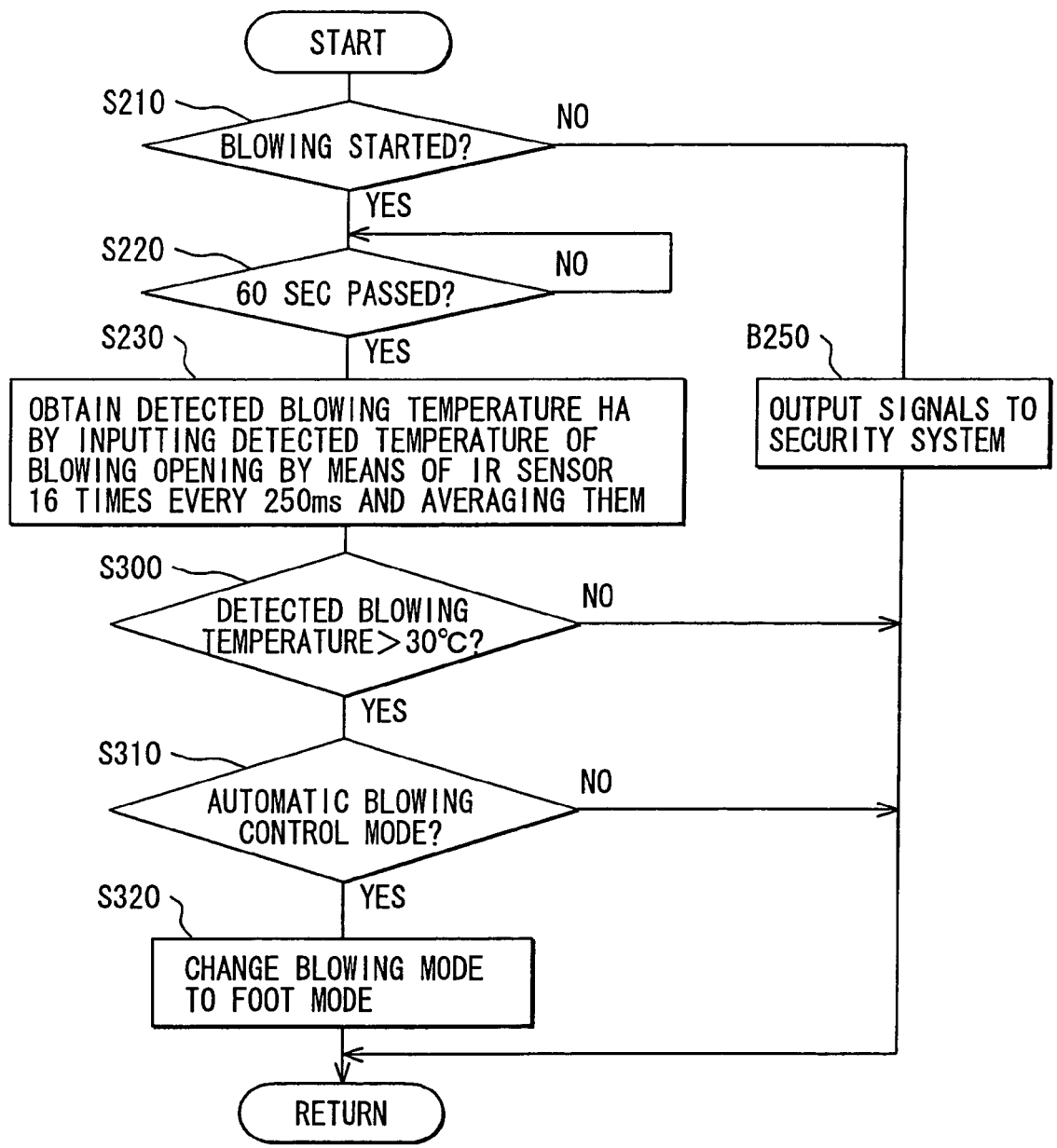
FIG. 6 is a flowchart of the operation of a control unit according to a second embodiment of the invention.

FIG. 6 is a flowchart of the process steps performed by the control unit 4 in this embodiment. The steps identical to those of FIG. 5 are given the same reference numerals in FIG. 6. The control unit 4 in this embodiment operates as follows. After performing the steps of determining whether air is blown (S210), determining whether 60 seconds have passed (S220), and calculating an average blowing temperature (S230), the control unit determines whether the blowing temperature TA obtained in Step 230 is equal to, or more than, 30° C. (S300). If yes, it proceeds to the next step S310. The control unit determines whether or not the user has manually selected an automatic blowing control mode that automatically changes the blowing mode. If yes, the control unit changes the blowing mode to the foot mode (S320).

Thereby, the actuator 18 drives the passageway open/close damper 17 to close the first and third passageways 6, 76 and to open the second passageway 7. Also, the actuator 16 drives the bypass open/close damper 15 to close the cooling air bypass passageway 14.

Some of the air that has passed through the evaporator 8 flows into the bypass passageway 11 of the heat adjustment means 10 and into the heater core 9. The ratio of the air flowing into the bypass passageway 11 to the air flowing into the heater core 9 is determined by the target degree of opening SWn of the air mix damper 12.

The air passing through the bypass passageway 11 and the air passing through the heater core 9 are mixed in the main passageway 5, which is then blown out into the second passageway 7. The air that has flown into the second passageway 7 is blown out into the compartment from the foot blowing opening. Thus the foot mode is suitably selected based on the temperature detected using the non-contact temperature sensor 50, and not a contact temperature sensor.

Similar to the first embodiment, the non-contact temperature sensor 50 detects the blowing temperature 60 seconds after the start of the air blowing, so that a more precise blowing temperature is obtained. The selection of the foot mode is thus accurately made because it is based on this precise value of blowing temperature, whereby it is prevented that hot air is blown toward the face of the user.

In this embodiment, too, the sensing region of the non-contact temperature sensor 50 should preferably include the two blowing openings 31 entirely, so that the sensor 50 can detect the average blowing temperature of air in the blowing openings 31. By selecting the foot mode based on this average value, the selection is made highly precisely.

Third Embodiment

Figure 7:
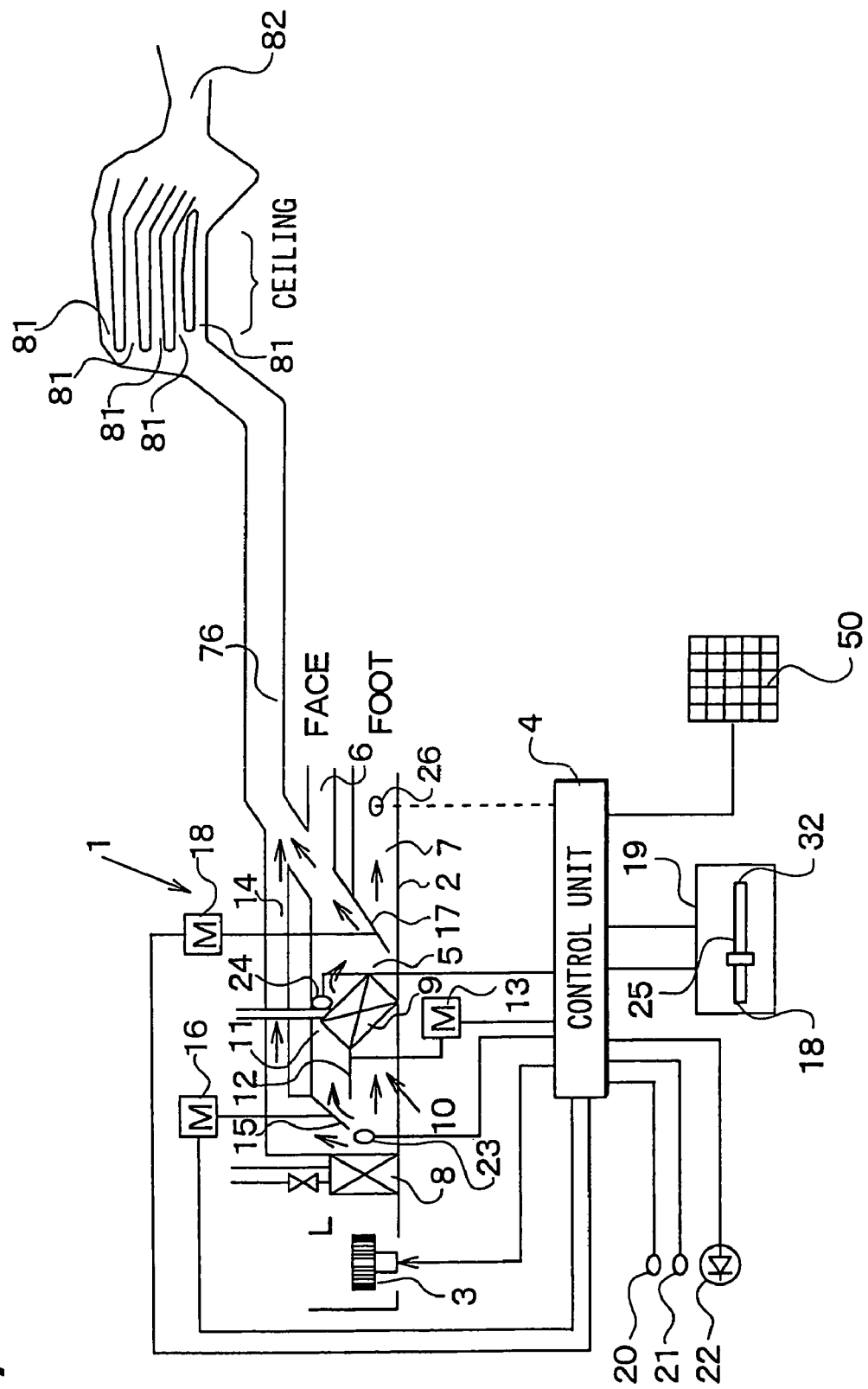
FIG. 7 is a schematic representation of the configuration of a vehicle air conditioning system according to a third embodiment of the invention.

In the first and second embodiments, the blowing temperature at the blowing openings 31 is controlled based on the blowing temperature detected by the non-contact temperature sensor 50. In this embodiment, the control unit adjusts the temperature of an interior material, such as cloth upholstery, for the ceiling of the car. The configuration of this embodiment is shown in FIG. 7.

The air conditioning system 1 in this embodiment includes a number of ducts 81 instead of the blowing openings 31 shown in FIG. 1B. These ducts 81 branch from the third passageway 76 and extend in a parallel relationship, and are connected to a blowing opening 82 on the downstream side.

The ducts 81 are made of a material with high heat conductivity such as copper or aluminum and are arranged between an exterior panel and interior material of the ceiling. Thus blown conditioned air from the third passageway 76 to the blowing opening 82 through the ducts 81 increases or decreases the temperature of the interior material of the ceiling.

The non-contact temperature sensor 50 of this embodiment detects the temperature of the interior material, instead of the blowing openings 31 shown in FIG. 1B, in a non-contact manner. The elements identical to those of FIG. 1B have the same reference numerals in FIG. 7.

Figure 8:
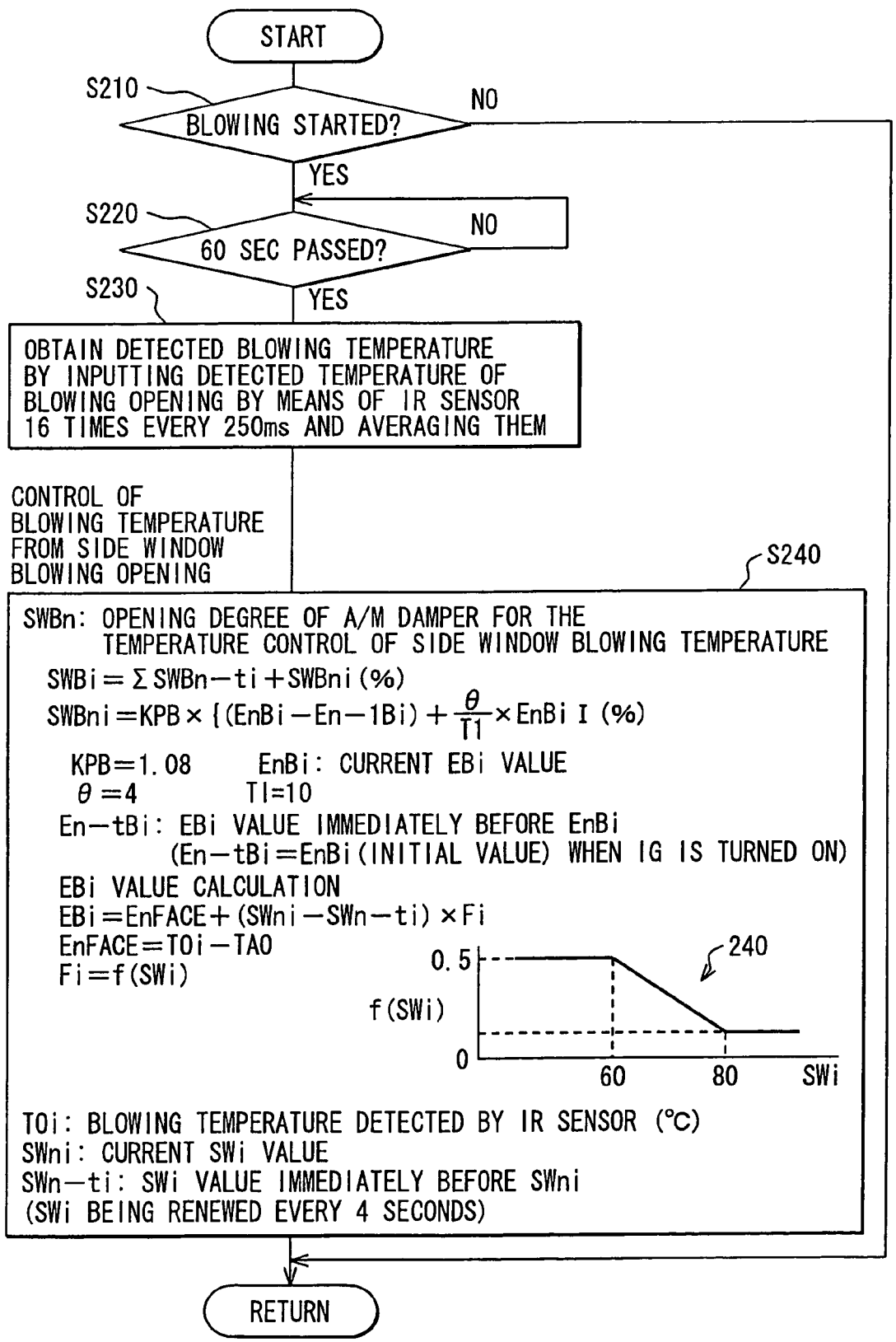
FIG. 8 is a flowchart of the operation of the control unit in FIG. 7.

FIG. 8 is a flowchart of the process steps performed by the control unit 4 in this embodiment. The steps identical to those of FIG. 5 have the same reference numerals as those in FIG. 8. The control unit 4 in this embodiment operates as follows.

When the bi-level mode is selected, for example, the control unit performs the steps of determining whether air is blown (S210), determining whether 60 seconds have passed (S220), calculating an average blowing temperature (S230), and controlling the blowing temperature (S240). Thereby, as with the first embodiment, air is conditioned to have a temperature determined by the target degrees of opening SWn and SWBi of the air mix damper 12 and bypass open/close damper 15, and supplied from the third passageway 76 into each of the ducts 81. This conditioned air flowing in the ducts 81 adjusts the temperature of the ceiling interior material, whereby the temperature inside the passenger compartment is adjusted. Thus the temperature of the interior material is controlled using the non-contact temperature sensor 50, and not a contact temperature sensor.

A conventionally used contact temperature sensor such as a thermistor can only detect a local temperature of the interior material. If there is an uneven temperature distribution in the interior material, the temperature adjustment based on this local temperature may result in unsatisfactory air conditioning. In this embodiment, however, the sensing region of the non-contact temperature sensor 50 includes the interior material entirely, so that the sensor can detect the average temperature of the interior material. The temperature control of the interior material is precisely carried out by using this average value.

Other Embodiments

The above third embodiment shows one example in which the temperature of the ceiling interior material is increased or decreased by causing conditioned air to flow through the ducts 81. These ducts 81 may be replaced by Peltier elements or electric heaters such as PTC heaters. Alternatively, each of the ducts 81 may have a discrete blowing opening to blow out the conditioned air for the temperature control of the interior material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air conditioning system in combination with a vehicle having a passenger compartment, the system comprising:

temperature adjusting means for adjusting a temperature of conditioned air to be blown from a blowing opening into the passenger compartment, the blowing opening being provided behind a front seat in the passenger compartment;

a non-contact temperature sensor for detecting a temperature, without directly contacting the blown air, of a sensing region including the blowing opening, the non-contact temperature sensor being located at a front side of the front seat in the passenger compartment in a vehicle front-rear direction; and control means for controlling the temperature adjusting means to achieve a desired temperature of the blown air using the temperature detected by the non-contact temperature sensor.

2. The vehicle air conditioning system in combination with the vehicle according to claim 1, wherein
   the control means controls such that if a difference between an expected air temperature and an actual air temperature detected by the non-contact temperature sensor is larger than a preset value the temperature control by the control means relative to the detected temperature is not affected by the large difference.

3. The vehicle air conditioning system in combination with the vehicle according to claim 1, wherein
   the control means controls the temperature adjusting means using a temperature detected by the non-contact temperature sensor after a predetermined time has passed after the start of air blowing.

4. The vehicle air conditioning system in combination with the vehicle according to claim 1, wherein
   the non-contact temperature sensor includes a plurality of temperature sensing elements, each capable of detecting the temperature of the sensing region in the passenger compartment in a non-contact manner, the temperature of the sensing region being detected by at least one of the plurality of temperature sensing elements.

5. The vehicle air conditioning system in combination with the vehicle according to claim 1, wherein the blowing opening is located in a pillar of the vehicle.

6. The vehicle air conditioning system in combination with the vehicle according to claim 1, wherein the blowing opening is located in a pillar of the vehicle, proximate to a driver's seat, for blowing air toward an upper side in the passenger compartment.

7. A vehicle air conditioning system in combination with a vehicle having a passenger compartment, the system comprising:

a face blowing opening communicating to a first passageway, a foot blowing opening communicating to a second passageway, and a third blowing opening, the third blowing opening being provided behind a front seat in the passenger compartment and communicated to a third passageway;

a non-contact temperature sensor mounted for detecting a temperature, without directly contacting blown air, of a sensing region including said third blowing opening, the non-contact temperature sensor being located at a front side of the front seat in the passenger compartment in a vehicle front-rear direction;

means for calculating a required blowing temperature using at least a set temperature;

means for calculating a target blowing temperature from said required blowing temperature; and temperature adjusting means for causing the temperature of air inside said third passageway to approach said target blowing temperature in accordance with at least said target blowing temperature and the temperature detected by said non-contact temperature sensor.

8. The vehicle air conditioning system in combination with the vehicle according to claim 7, wherein said temperature adjusting means comprises:

an evaporator and a heater core arranged in the passageway;

a heat adjustment bypass passageway arranged in the passageways, for bypassing the heater core;

an air mix damper for adjusting a volume of air passing through said heater core and that of air passing through said heat adjustment bypass passageway to supply air into each of said passageways;

a cooling air bypass passageway for bypassing said heater core and said heat adjustment bypass passageway so as to direct cooling air from said evaporator directly into said third passageway; and a bypass open/close damper for opening and closing said cooling air bypass passageway.

9. The vehicle air conditioning system in combination with the vehicle according to claim 8, wherein a degree of opening of said air mix damper is feedback controlled using a deviation between said entire surface temperature detected by said non-contact temperature sensor and said target temperature.

10. A vehicle air conditioning system in combination with a vehicle having a passenger compartment, the system comprising:

a face blowing opening communicating to a first passageway, a foot blowing opening communicating to a second passageway, and a third blowing opening, the third blowing opening being arranged in a vicinity of a passenger and communicated to a third passageway;

a non-contact temperature sensor mounted for detecting a temperature, without directly contacting blown air, of a sensing region including said third blowing opening, the non-contact temperature sensor being located at a front side of the front seat in the passenger compartment in a vehicle front-rear direction;

means for calculating a required blowing temperature using at least a set temperature;

means for calculating a target blowing temperature from said required blowing temperature;

temperature adjusting means for causing the temperature of air inside said third passageway to approach said target blowing temperature in accordance with at least said target blowing temperature and an entire surface temperature of said third blowing opening detected by said non-contact temperature sensor;

blowing mode selecting means for selecting either one of a face mode and a foot mode;

a temperature sensor for detecting a temperature at the foot blowing opening, wherein said means for calculating a target blowing temperature includes means for calculating at least a target blowing temperature for the face blowing opening and a target blowing temperature for the foot blowing opening that is higher than the temperature for the face blowing opening, based on the required blowing temperature; and said temperature adjusting means includes means for causing the temperatures of air in said first, second, and third passageways to approach their respective target blowing temperatures in accordance with at least an entire surface temperature of said third blowing opening detected by said non-contact temperature sensor, a temperature at the foot blowing opening detected by the temperature sensor, the blowing mode selected by said blowing mode selecting means, said target blowing temperature for the face blowing opening, and said target blowing temperature for the foot blowing opening.

11. A vehicle air conditioning system in combination with a vehicle having a passenger compartment, the system comprising:

a face blowing opening communicating to a first passageway, a foot blowing opening communicating to a second passageway, and a third blowing opening, the third blowing opening being arranged in a vicinity of a passenger and communicated to a third passageway, the system comprising:

a non-contact temperature sensor mounted for detecting a temperature, without directly contacting blown air, of a sensing region including said third blowing opening, the non-contact temperature sensor being located at a front side of the front seat in the passenger compartment in a vehicle front-rear direction;

means for calculating a required blowing temperature using at least a set temperature;

means for calculating a target blowing temperature from said required blowing temperature; and temperature adjusting means for causing the temperature of air inside said third passageway to approach said target blowing temperature in accordance with at least said target blowing temperature and an entire surface temperature of said third blowing opening detected by said non-contact temperature sensor; wherein said vehicle includes a pillar between a front side windshield and a rear side windshield for supporting a ceiling panel, and said third blowing opening is arranged in said pillar for blowing air toward an upper half of a body of a passenger.

* * * * *